Patented Mar. 1, 1938

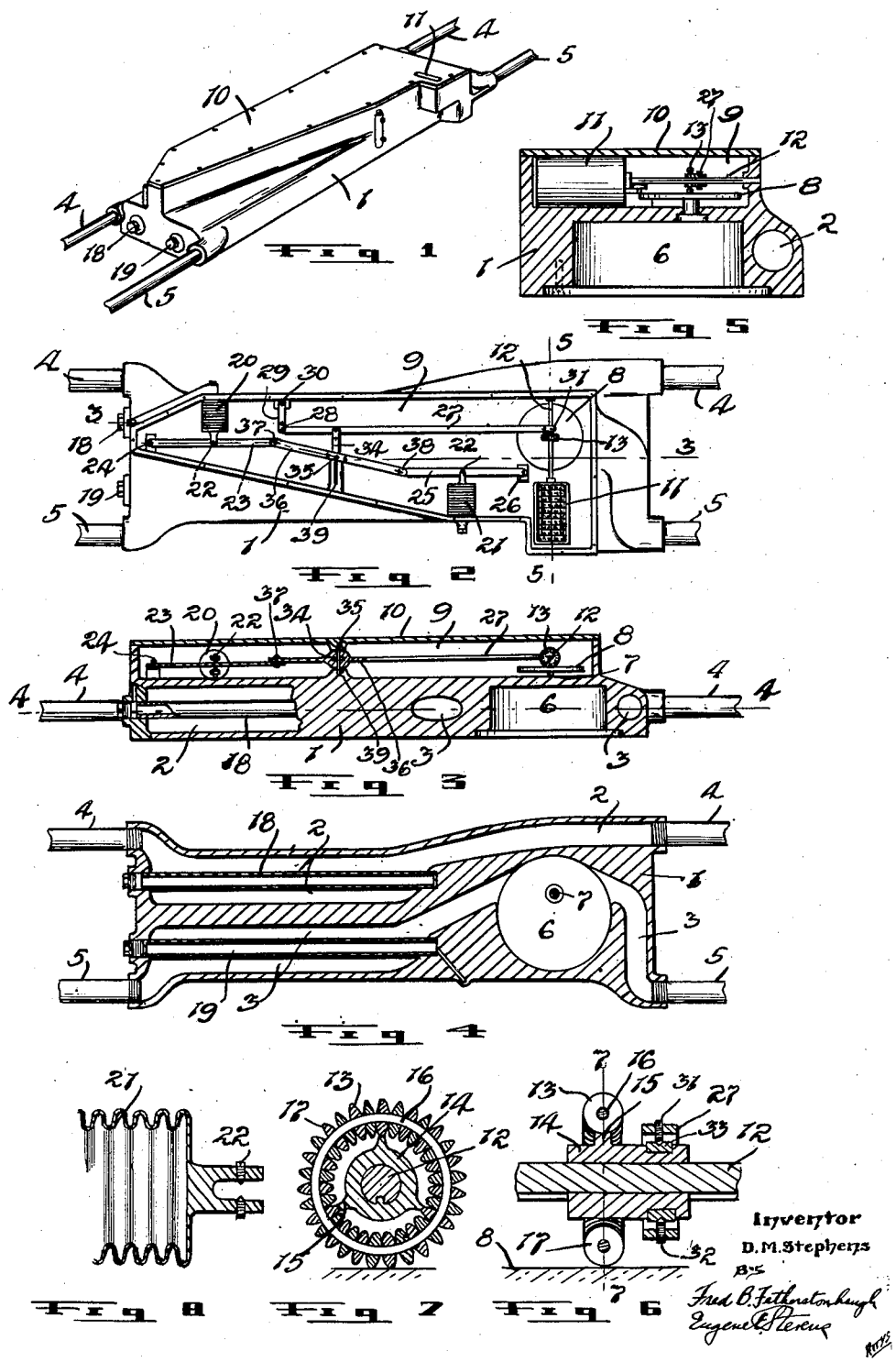

2,109,757

UNITED STATES PATENT OFFICE 2,109,757

HEAT CONSUMPTION METER

Donald M. Stephens, Winnipeg, Manitoba, Canada

Application December 1, 1933, Serial No. 700,578

1 Claim. (Cl. 73—193)

The invention relates to improvements in devices for measuring the heat flow through pipes and a general object of the invention is to provide a device of simple construction which when installed in a fluid heating system, will register the total amount of heat units used for a period of time so that the one utilizing the heat can be properly charged for the amount of heat units extracted by him for heating purposes.

A further object is to provide a device which can be utilized also with equal facility in a refrigerating or cooling system to measure the heat units absorbed by such system.

A further object is to construct a device which will operate without requiring the maintaining of the ingoing or outgoing fluid at a predetermined temperature and which will also operate where the ingoing fluid is maintained at a constant temperature.

A still further object is to provide a device embodying a meter for measuring the flow in the system, a register driven thereby and a mechanism for varying the speed ratio between the meter and the instrument in direct proportion to the difference in temperature between the ingoing and outgoing fluids.

A further object is to construct the device so that it can be constructed and installed at relatively small cost, will give an accurate reading and has no sensitive parts apt to get out of order.

A still further object is to construct the driving connection between the meter and the register so that there is no possibility of slippage and such that all required movements are accommodated expeditiously.

A further object of this invention is to provide a heat consumption register which is provided with an expansible liquid hermetically sealed between a system of thermometers and bellows.

With the above more important and other minor objects in view which will become more apparent as the description proceeds, the invention consists essentially in the arrangement and construction of parts hereinafter more particularly described, reference being had to the accompanying drawing, in which:—

Fig. 1 is a perspective view of the device.

Fig. 2 is a plan view with the cover plate removed.

Fig. 3 is a longitudinal sectional view at 3—3 Figure 2.

Fig. 4 is a horizontal sectional view at 4—4 Figure 3.

Fig. 5 is a cross sectional view at 5—5 Figure 2.

Fig. 6 is an enlarged detailed vertical cross sectional view centrally and transversely through the wheel.

Fig. 7 is a vertical sectional view at 7—7 Figure 6.

Fig. 8 is a vertical cross sectional view of one end of the bellows.

In the drawing like characters of reference indicate corresponding parts in the several figures.

I might initially explain that this device is of particular value for determining the amount of heat units or B. t. u. used by a customer where the heating medium such as hot water is distributed to the customer from a central heating plant, the water flowing through supply and return pipes provided. In such a system, the device indicates the number of heat units extracted from the system. It is to be observed, however, that the device can be utilized with equal facility in a cooling or refrigerating system and in such case, it will register the amount of heat absorbed by the system.

Referring now to the drawing, it will be seen that I provide a cast body or casing 1 which has two lengthwise extending passages 2 and 3 reserved therein, the passage 2 being in direct communication with the supply or inflow pipe 4 of the system and the passage 3 being in direct communication with the return or outflow pipe 5 of the system.

Provision is made for the mounting of a meter 6 in the casing, the meter being of any well known design and communicating with the passage 3 so that the said meter will measure the flow of liquid passed through the system. While I have shown the meter as associated with the outflow pipe, it is to be understood that such position is simply a matter of convenience as a meter could be located in any position where it will measure the flow through the system. The driven spindle of the meter is indicated by the reference numeral 7 and to the upper end of the spindle, I secure a horizontally disposed disc or turntable 8 which is rotated by the meter. The upper part of the casing 1 provides a compartment 9 for the disc and other parts later described and a suitable cover plate 10 is provided for closing the top of the compartment.

A register 11 is mounted in the compartment and has an operating shaft 12 centrally crossing the disc or turntable, said shaft being suitably mounted in bearings provided. The details of the register are not herein described as any instrument suitable for the purpose will suffice, it being understood that the instrument is driven by the shaft 12.

On the shaft, I mount a wheel 13 which rides the turntable to be driven thereby. The wheel is feathered on the shaft so that it can be shifted endwise of the shaft and will operate to drive the shaft in any of its shifted positions. The wheel is herein shown as formed from a sleeve like hub 14 having three radiating arms 15 which carry a ring 16 on which I have mounted rotatably a plurality of relatively small similar rollers 17. Actually the outer ends of the arms are shaped similar to the rollers.

This type of wheel is readily driven by the turntable and the rollers provided allow of the easy out movement of the wheel when it is shifted to either side of the centre of the turntable.

In the passages 2 and 3, I mount similar thermometers 18 and 19 which are for the greater part submerged in the passing liquid. These thermometers are in the form of hollow tubes containing a fluid such as toluol or alcohol sensitive to temperature change and adapted to quickly expand or contract under variations in the temperature of the liquid flowing in the passages. The thermometer 18 is directly connected in any suitable manner with the outer end of an expansible and contractible bellows 20 and the inner end of the thermometer 19 is connected in any suitable manner with the outer end of a similar bellows 21, both bellows having their outer ends permanently attached to the wall of the compartment 9. The inner end of each bellows is supplied with pairs of lugs carrying screw threaded pivot pins 22.

The bellows 20 is connected by its pivot pins pivotally to a lever arm 23 which has one end pivotally attached to the wall of the casing in any suitable manner as indicated at 24. A similar lever arm 25 is pivotally connected by the pivot pins to the bellows 21 and has one end pivotally fastened at 26 in any suitable manner to the bottom of the compartment. A lever 27 extends longitudinally within the compartment and has one end pivotally attached at 28 to a swinging arm 29 pivotally attached at 30 to the adjacent wall of the compartment.

The other end of the lever 27 is forked and spans the shaft 12 and carries aligned screw threaded pivot pins 31 and 32 which have their inner ends engaging a ring 33 mounted on the sleeve like hub of the wheel 13, the arrangement being such that any lateral swinging movement of the lever 27 shifts the wheel endwise of the shaft 12. To the lever 27 I pivotally connect an arm 34 which is also attached pivotally by a vertical pin 35 to a link 36. The ends of the link are longitudinally slotted and have the slots slidably receiving pivot pins 37 and 38 carried by the adjacent ends of the lever arms 23 and 25. The pin 35 has the ends thereof slidably received in slots 39, such slots extending transversely of the compartment and being parallel to the shaft 12.

From the above, it will be seen that the bellows 20 will expand and contract directly under the influence of the temperature of the inflowing liquid and the bellows 21 will expand or contract directly under the influence of the outgoing liquid and that any movement of the wheel in a direction away from the centre of the turntable is directly proportional to the difference in the temperature of the liquids flowing in the supply and the return pipes.

As the speed of the turntable is directly proportional to the number of pounds of liquid passing through the meter and the wheel is moved away from the centre of the turntable a distance directly proportional to the difference of temperature between the ingoing and outgoing liquid, the shaft drives the register so that the register registers the product of the two or the B. t. u. extracted from the system.

To summarize, it will be apparent that the device embodies a meter for measuring the flow in the system, a register driven thereby and a mechanism for varying the speed ratio between the meter and the register in direct proportion to the difference of temperature between the ingoing and outgoing liquid with the result that the reading at the register is given in B. t. u.

When the device is utilized for measuring the amount of heat extracted from a system such as a heating system, the wheel will travel outwardly from the centre of the disc in one direction and when the device is utilized to measure heat absorbed by the system such as a cooling or refrigerating system, the wheel will be moved away from the centre of the disc in the opposite direction to that previously mentioned.

What I claim as my invention is:—

A device for registering the heat consumption in a heating system comprising, in combination with the system which includes a feed and return conduit, a meter provided with inflow and outflow pipes, a rotatable registering surface driven by said meter, a lever actuated registering arm and an element connected at the free end of said arm in contact with said registering surface, temperature responsive means in the feed and return conduits, a pair of expansible and contractible containers connected and communicating with the interior of said temperature responsive means, the substance therewithin being hermetically sealed between said temperature responsive means and said containers, said expansible and contractible containers and said temperature responsive means containing an expansible and contractible fluid, means comprising levers connected by a link connecting said expansible and contractible containers with said registering arm and adapted to shift the free end of said registering arm towards or away from the centre of said registering surface in direct proportion to the difference in temperature between the temperature responsive means, the movement at the free end of said registering arm being a function of the difference in movement at any two points upon said levers.

DONALD M. STEPHENS.